United States Patent [19]

Sedlmair et al.

[11] E Patent Number: Re. 33,388

[45] Reissued Date of Patent: Oct. 16, 1990

[54] TOE PIECE FOR A SAFETY SKI-BINDING

[75] Inventors: Gerhard Sedlmair, Farchant; Walter Knabel, Murnau, both of Fed. Rep. of Germany

[73] Assignee: Marker Deutschland GmbH, Eschenlohe, Fed. Rep. of Germany

[21] Appl. No.: 226,053

[22] Filed: Jul. 29, 1988

Related U.S. Patent Documents

Reissue of:

[64] Patent No.: 4,660,849
Issued: Apr. 28, 1987
Appl. No.: 783,926
Filed: Jan. 23, 1985

[30] Foreign Application Priority Data

Jan. 2, 1984 [DE] Fed. Rep. of Germany ..... 3403472

[51] Int. Cl.[5] ..... A63C 9/08

[52] U.S. Cl. ..... 280/625; 280/629

[58] Field of Search ..... 280/623, 625, 626, 629, 280/630

[56] References Cited

U.S. PATENT DOCUMENTS

| | | | |
|---|---|---|---|
| 3,667,770 | 6/1972 | Lawrence | 280/629 |
| 3,920,256 | 11/1975 | Sittmann | 280/625 |
| 4,170,372 | 10/1979 | Salomon | 280/626 |
| 4,336,956 | 6/1982 | Richert et al. | 280/625 |
| 4,516,792 | 5/1985 | Scheck et al. | 280/625 |
| 4,533,156 | 8/1985 | Gertsch | 280/629 |

FOREIGN PATENT DOCUMENTS

| | | |
|---|---|---|
| 1962103 | 6/1971 | Fed. Rep. of Germany . |
| 2473328 | 7/1981 | Fed. Rep. of Germany . |
| 3335878 | 5/1984 | Fed. Rep. of Germany . |
| 477890 | 10/1969 | Switzerland . |

*Primary Examiner*—Charles A. Marmor
*Assistant Examiner*—Michael Mar
*Attorney, Agent, or Firm*—D. Peter Hochberg; Mark Kusner; Louis J. Weisz

[57] ABSTRACT

A toe piece for a safety ski binding having a pivotable rearwardly facing soleholder for releasably engaging the sole of a ski boot, a pedal having a series of ramps inclined towards opposite sides of the binding and joined by flattened junctures and engageable by lower support elements when the pedal is subjected to downward and sidewise forces for receiving forces which offset the frictional forces resulting from the engagement of the boot and the pedal. The toe piece further includes a second set of transverse ramps engageable by upper support elements when the pedal is subjected to upward and sidewise forces for receiving forces which offset the frictional forces resulting from the engagement of the boot and the pedal.

25 Claims, 5 Drawing Sheets

TOE PIECE FOR A SAFETY SKI-BINDING

Matter enclosed in heavy brackets [ ] appears in the original patent but forms no part of this reissue specification; matter printed in italics indicates the additions made by reissue.

The present invention relates to a toe piece of a safety ski-binding, and in particular to a toe piece or front piece constructed to compensate for the effect of friction between a ski boot and the toe piece on the release characteristics of the unit.

Toe pieces are known in the market which have a sliding plate which is fixably mounted on the ski for eliminating the effect of friction between the boot and the binding. Under conditions where the toe piece receives forces from the side and is, at the same time under load from the pressure of the ball of the foot, the friction between the ski boot sole and the ski together with the sliding plate, respectively, is avoided. However, such toe pieces do by no means operate free of friction. Only the location where the friction occurs is moved under the pedal and is independent from the material and the condition of the ski boot sole.

It is an object of the present invention to provide a toe piece for a ski binding whose release resistance is virtually independent of the friction created by the ball of the foot.

Another object of the invention is to provide an improved toe piece for a safety ski binding which is constructed to compensate for the effect of friction between a skier's boot at the ball of the skier's foot and the binding for many directions of applied forces, so as to avoid the effect of such friction or the release characteristics of the binding.

Yet another object of the invention is to provide a toe piece for a safety ski binding as described above which is of simple construction, and which can be made and used in an effective and efficient manner.

Other objects will become apparent from the description to follow and from the appended claims.

These objects are achieved according to the preferred embodiment of the invention by the provision of various inclined surfaces in the binding toe piece which, depending on the angle at which forces are applied to the binding according to the direction in which the skier is leaning, are engaged by cooperating binding structure to generate a resultant force whose direction and magnitude compensate for the resultant force from the friction which occurs between the ski boot and the toe piece. The direction of the compensating force is determined by the angle of inclination of the inclined surfaces. The binding structure which is engageable with the inclined surfaces can be in the form of rollers mounted on axes fixed relative to the surfaces, and/or the heads of rigid posts fixed relative to the inclined surfaces. The preferred toe piece includes a pair of sole holders pivotally mounted for rotation about laterally spaced vertical axes.

The preferred embodiment of the invention is described below in connection with the following drawings:

FIGS. 4–7 are representations similar to FIG. 3 showing the toe piece when different conditions of load are present.

Figure 1:
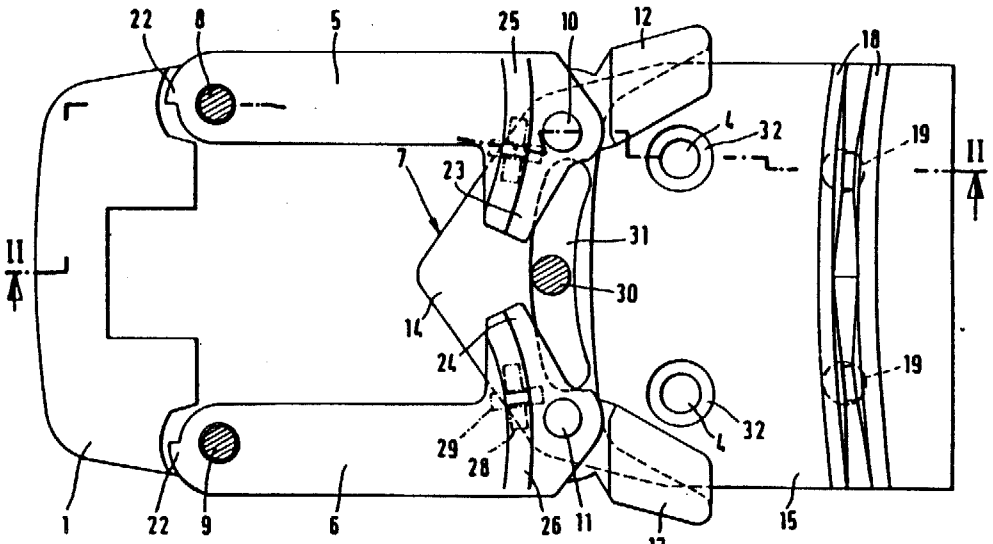
FIG. 1 is a horizontal cross sectional view of the preferred toe piece along line I—I in FIG. 2.

The toe piece as shown has a housing which comprises a bottom portion 1 and an upper portion 2. The housing can be mounted by means of screws on a ski in a known manner. For this purposes the bottom portion 1 is provided with holes 4 in an extension 3 which projects with respect to the upper portion 2. The holes 4 are adapted to receive mounting screws. Within the housing a quadrangle of links is located. The linkage quadrangle comprises levers 5 and 6 and a coupling element 7. Levers, 5, 6 are pivotally mounted on axles 8 and 9, respectively; said axles 8 and 9 extend within said housing perpendicularly with respect to the plane of the ski. Mounting pins 10 and 11 are provided for connecting the coupling element with the respective levers 5, 6. Each of the mounting pins 10, 11 also supports a sole holder 12 and 13, respectively. The releasable locking of said sole holders does not form part of the present invention and is therefore not shown and not described. Means known in the art may be used to simultaneously hold the linkage quadrangle in its normal position shown in FIG. 1.

Figure 2:
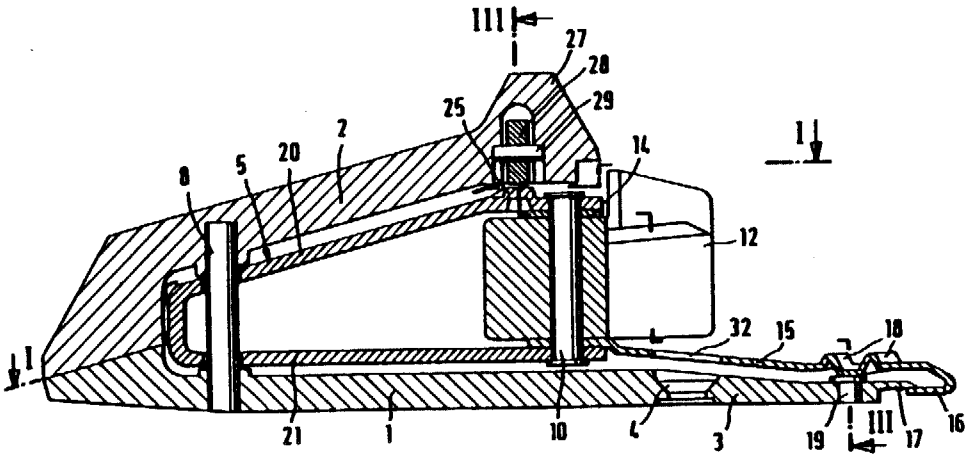
FIG. 2 is a longitudinal sectional view of the toe piece along II—II in FIG. 1.

FIG. 2 shows that the coupling element 7 of the linkage quadrangle consists of two stamped sheet metal pieces 14, 15. One of said stamped pieces 14 is arranged above the sole holder 12, 13, while the other stamped piece 15 is arranged under the sole holder. The lower stamped sheet metal piece 15 extends beyond the extension 3 of the bottom portion 1 of the housing and extends with its free end 16—which is bent downwardly and backwardly—around the recessed edge 17 of the extension 3. The portion of the stamped sheet metal piece 15 which extends over extension 3 forms a pedal having cross ribs 18 which are known per se. Extension 3 includes lower support means showing two supporting elements or posts 19 which are arranged symmetrically with respect to the longitudinal axis of the front piece. These supporting elements 19 are spaced by a distance which corresponds to the elastic area of the toe piece (see FIG. 1).

Figure 3:
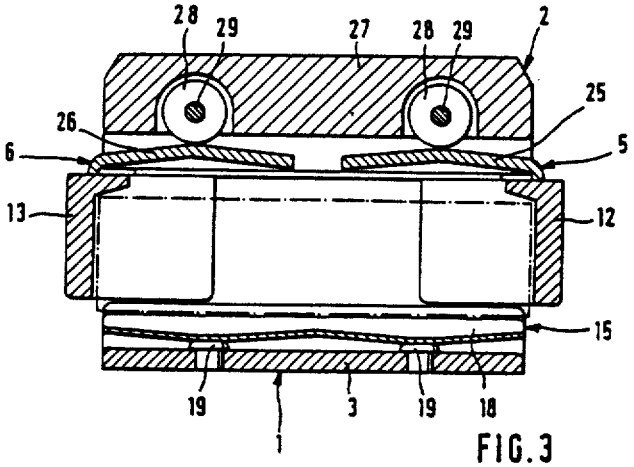
FIG. 3 is a cross sectional view of the toe piece along III—III in FIG. 2.

The portion of the stamped sheet metal piece 15 extending between the cross ribs 18 is adapted for cooperation with the supporting elements 19; this portion has, when looking in the longitudinal direction, approximately the form of a flat W; the bottom points of said W being flattened and resting in the normal position on the supporting elements 19 as shown in FIG. 3.

The levers 5 and 6 of the linkage quadrangle have a cross section in form of a U, within the legs of which the connecting pins 10 and 11 for the coupling element 7 and the sole holders 12, 13 are supported. In FIG. 2 the legs of lever 5 are shown in a sectional representation and are designated 20 and 21, respectively. As may be noted from FIG. 2 the bottom leg 21 of each lever is pivotally mounted on the corresponding axles 8 and 9, respectively with a smaller play than is true for the upper leg 20. This is done for a reason which will be described in detail below. A connecting web of each lever 5, 6 extends at the side where it is pivotally mounted to form a nose 22 as shown in FIG. 1.

At the free ends of the levers 5, 6 the connecting web ends at the location of the connecting pins 10, 11. The upper leg of each lever 5, 6 comprises an extension 23 and 24, respectively. Each of these extensions 23, 24 extends towards the longitudinal axis of the toe piece. In this area each lever 5, 6 comprises a raised portion 25, 26, respectively, each being curved with respect to the corresponding axes of axles 8 and 9, respectively as shown in FIG. 1. As may be gathered from FIG. 3, each raised portion 25, 26 has the form of a flat A, the pointed end of which is flattened. At its end facing towards the ski boot the upper portion 2 of the housing comprises a bulge 27. Upper support means in the form of two rollers 28 are supported within bulge 27 on respective axle pins 29. As is shown in FIG. 1 the axle pins 29 extend radially towards the appropriate axis 8 and 9, respectively, of the levers 5 and 6, respectively. The rollers 28 serve as upper supporting elements for levers 5, 6. FIG. 3 shows that in the normal position the flattened points of the expansion 25, 26 abut rollers 28.

At the end facing the ski boot the two housing portions 1, 2 are connected with each other by means of a screw 30 which is shown in FIG. 1 in cross section. This screw 30 extends through congruent elongated holes 31 which are provided in pieces 14, 15 of the coupling element 7. Assembly holes 32 are provided within the stamped sheet metal piece 15 for passing mounting screws; said assembly holes 32 are located above the screw holes 4 when the apparatus is in its normal position.

FIGS. 1 to 3 show the front piece in its normal position. FIG. 3 and the following figures represent a ski boot sole with a dashed line. The ski boot sole is supported by the cross ribs 18 of the pedal of the stamped sheet metal piece 15, which is simultaneously used as a part of the coupling element. Further, the ski boot sole is held from the side, from the front, and from above by means of the sole holders 12, 13. If, for instance, a force acting parallel to the ski is applied to the sole holder 12 which exceeds the holding force, then the linkage quadrangle pivots into the position shown in FIG. 4. Because of the exclusively sideways acting load, none of the supporting elements is effective. As soon as the preset release resistance is reached the sole holder 12 will release the ski boot sole sideways and in upward direction in a known manner. If the load decreases prior to or after the release of the ski boot the linkage quadrangle returns to its normal position of FIG. 3.

Figure 4:
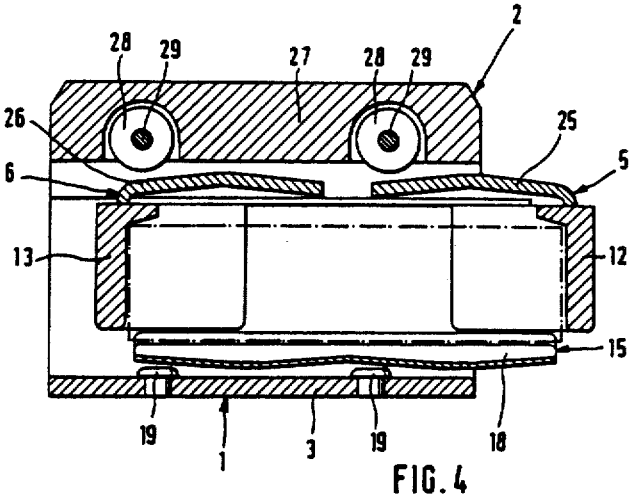
Figure 5:
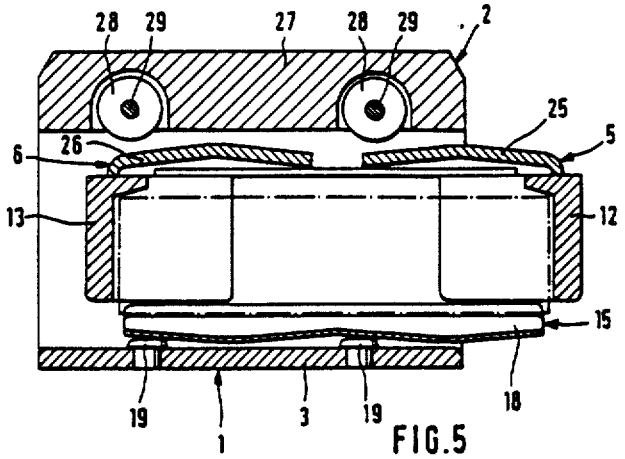

FIG. 5 shows the situation for load condition which was changed with respect to that of FIG. 4. In FIG. 5 a downwardly directed load is present in addition to the side load. This force is taken up by the two supporting elements 19. Because in accordance with the invention the bottom side of the pedal has the form of a flat W, a frictional resistance is virtually avoided which would otherwise have to be compensated for by a reduction in the preset release value of the binding. Therefore, even if a heavy foot-load is present, the release resistance cannot unintentionally reach higher values which would endanger the leg of the skier. The angle of the legs of the "W" of pedal 15 engageable by supporting elements 19 is selected so that the friction force between elements 19 and the bottom of pedal 15 is offset by force imparted by elements 19 on the pedal to compensate for the friction. The repositioning of the sole holders 12, 13 in vertical direction is made possible—as was pointed out above—by the fact that the upper legs 20 of the levers 5 and 6 are pivotally mounted with correspondingly large play on the axles 8 and 9.

Figure 6:
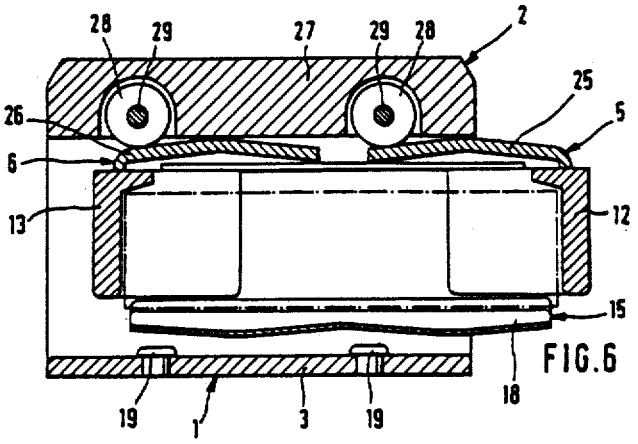

FIG. 6 shows in comparison with FIG. 5 the load condition for an additional so called backward load. In this situation the raised portions 25, 26 of the levers 5, 6 are supported by the rollers 28. Also for this condition of load the design of the invention makes it possible that the sidewise release resistance remains virtually unchanged. This occurs because the angle of inclination of the camming surfaces of portions 25 and 26 is selected so that the force imparted to the respective portions 25, 26 by roller 28 is equal and opposite to the friction force from the engagement of the rollers and the same surfaces.

Finally FIG. 7 discloses another load condition. In this instance the sidewise load is accomplished by a rotational load. Again, the release resistance for the side load is not increased inasmuch as the inclined camming surfaces of the invention provide a compensation for the present friction by means of corresponding force components in the direction of release.

The invention has been described in detail with particular emphasis as the preferred embodiment thereof, but it should be understood that variations and modifications within the spirit and scope of the invention may occur to those skilled in the art to which the invention pertains.

We claim:

1. A toe piece for a safety ski binding, said toe piece having a rearward portion, a longitudinal axis and longitudinally extending side portions, and comprising:

base means;

soleholder means pivotally mounted [in fixed relation with] *on* said base means and biassed to a central, rearwardly facing direction for engaging and retaining a ski boot sole in the binding, said soleholder means pivoting to release a retained ski boot when a sidewise force applied to the ski boot exceeds a predetermined value;

lower support means mounted on said base means;

pedal means for engaging the sole portion of a ski boot in said toe piece, said pedal means being pivotally mounted for movement with said soleholder means in response to the movement of the ski boot retained in the toe piece; said pedal means being disposed over said lower support means and having first ramp means including a series of resilient ramps joined by juncture means; said juncture means extending in directions generally parallel to said side portions and located for engagement by said lower support means when a downward force is exerted on said pedal means in the absence of sidewise forces, said first ramp means including ramps inclined from said juncture means towards opposite sides of said toe piece for engagement by said lower support means when said pedal means is subjected to downward and sidewise forces, the ramps configured for engagement by said lower support means for establishing forces offsetting the sidewise forces resulting from friction between [the ski boot] *said ramp means* and [the binding] *said lower support means.*

2. The invention according to claim 1 wherein said first ramp means includes a series of transverse ramps in the form of a flattened W when viewed in the longitudinal direction, said juncture means comprising flattened regions between the transverse ramps of said first ramp means.

3. The invention according to claim 1 wherein said lower support means comprise posts mounted in said base means.

4. The invention according to claim 3 wherein said posts include a pair of posts disposed symmetrically on opposite sides of the longitudinal axis of said toe piece.

5. The toe piece according to claim 1 and further comprising a pair of levers mounted on said base means for pivotal movement about vertical axes disposed on opposite sides of the longitudinal axis of the toe piece, said levers extending rearwardly and each carrying vertical soleholder axles disposed symmetrically about the longitudinal axis;

and wherein said soleholder means comprises a pair of soleholders pivotally mounted on said soleholder axles.

6. The invention according to claim 5 and further including a coupling member mounted on said soleholder axles and extending rearwardly, said pedal means forming part of said coupling member.

7. The invention according to claim 1 and further including:

upper support means fixedly mounted relative to said base means;

second ramp means movable in response to movement of said soleholder means, said second ramp means including transverse ramps meeting at a second juncture means, said second juncture means being engageable by said upper support means when said soleholder means is subjected to upward forces in the absence of sidewise forces, said transverse ramps of said second ramp means being inclined towards the opposite sides of said toe piece for engagement by said upper support means when said soleholder means is subjected to upward and sidewise forces, or to rotational loads, the ramps engaged by said upper support means being contoured to establish forces offsetting the forces resulting from friction between the latter ramps and said upper support means.

8. The invention according to claim 7 wherein said upper support means comprise roller means mounted for rotation about longitudinal axes.

9. The invention according to claim 7 and further comprising a pair of levers pivotally mounted on said base means for pivotal movement about vertical axes disposed on opposite sides of the longitudinal axis of the toe piece, said soleholder means including soldeholders pivotally mounted on said respective levers, and said second ramp means comprising a pair of flattened A-shaped portions on the respective levers engageable by said upper support means.

10. A front piece for a safety ski binding, said front piece comprising:

base means mountable on a ski;

at least one sole holder mounted to pivot relative to said base means against the force of a spring in response to the application of sideways forces against said sole holder;

said sole holder being further adapted to restrain a boot sole on the sides, and in forward and upward directions;

a pedal attached to and pivotal with said sole holder, having a resilient area, and being held in a normal position and movable relative to said base means to generally follow the pivotal movement of the ski boot in the front piece, and having a boot supporting area with a lower portion facing the base means and further having in said resilient area the generally shape of a flattened W with flattened tips and ramps joining the tips; and.

two supporting elements fixedly mounted with respect to said base means and being spaced by a distance corresponding to said resilient area, said supporting elements abutting the flattened tips when said pedal is in the normal position and engaging said ramps in response to downward and sidewise forces which move said sole holder, the force of said supporting elements against said ramps offsetting the frictional force between said supporting elements and said pedal.

11. The front piece of claim 10 wherein said at least one sole holder comprises two sole holders, said front piece comprising a linkage quadrangle including a coupling element, said two sole holders being pivotally supported in said coupling element and a portion of said coupling element forming the pedal.

12. The front piece of claim 10 and further comprising a housing for receiving components of the front piece, and supporting element means mounted on said housing, said sole holder(s) each having a supporting area movable therewith, said supporting area having towards the side of support the form of a flat A with a flattened apex abutting said support element means when the pedal is in the normal position, and having inclined camming surfaces inclined for engagement by said support element means with a force offsetting the friction force between the support element means and said supporting area.

13. The front piece of claim 12 wherein said supporting element means comprises a roller.

14. The front piece of claim 10 wherein said base means has a longitudinal axis and said at least one sole holder comprises a pair of sole holders mounted to pivot about axes transverse to said base means and equidistant from said longitudinal axis, and said front piece further comprising a housing and supporting element means mounted on the housing, each of said sole holders including an A-shaped supporting area movable therewith, the supporting areas being arranged symmetrically with respect to said longitudinal axis for engaging said supporting areas.

15. A front piece for a safety ski binding, said front piece comprising:

base means mountable on a ski and having a longitudinal axis;

two sole holders arranged on opposite sides of said front piece;

said sole holders being mounted to pivot against the force of a spring in response to the application of sideways forces against said sole holders;

said sole holders being further adapted to restrain a boot sole on the sides, and in forward and upward directions;

a pedal pivotal with said sole holders and having a resilient area, and being held in a normal position and movable relative to said base means to generally follow the pivotal movement of the ski boots in the front piece, and having a boot supporting area with a lower portion facing the base means and further having in said resilient area the general shape of a flattened W with flattened tips and ramps joining the tips; and, two supporting elements fixedly mounted with respect to said base means and being spaced by a distance corresponding to said resilient area, said supporting elements abutting the flattened tips when said pedal is in the normal position and engaging said ramps in response to downward and sidewise forces which move said sole holder, the force of said supporting elements against said ramps offsetting the frictional force between said supporting elements and said pedal.

*16. A toe piece for a safety ski binding comprising:*

*base means;*

*means for engaging and retaining upper and lower portions of a toe section of a ski boot to restrain the toe section against vertical movement relative to the plane of a ski on which the toe piece is mounted, wherein said means for engaging and retaining is laterally movable as a unit with the movement of the ski boot and includes,*

*soleholder means pivotally mounted with respect to said base means and biased to a central, rearwardly facing direction for engaging and retaining said toe section of a ski boot in the binding, said soleholder means pivoting to release a retained ski boot when a sidewise force applied to the ski boot exceeds a predetermined value,*

*lower support means mounted on said base means; and,*

*pedal means for engaging the bottom of the sole portion of a ski boot in said toe piece, said pedal means being pivotally mounted for movement with said soleholder means in response to the movement of the ski boot retained in the toe piece; said pedal means being disposed over said lower support means and having first ramp means including a series of ramps joined by juncture means; said juncture means extending in directions generally parallel to said side portions and located for engagement by said lower support means when a downward force is exerted on said pedal means in the absence of sidewise forces, said first ramp means including ramps inclined from said juncture means toward opposite sides of said toe piece for engagement by said lower support means when said pedal means is subjected to downward and sidewise forces, the ramps configured for engagement by said lower support means for establishing forces offsetting the sidewise forces resulting from friction between said ramp means and said lower support means.*

*17. A toe piece for a safety ski binding, said toe piece having a rearward portion, a longitudinal axis and longitudinally extending side portions, and comprising:*

*base means,*

*soleholder means pivotally mounted on said base means and biased to a central, rearwardly facing direction for engagement and retaining an upper surface of a ski boot sole in the binding, said soleholder means pivoting to release a retained ski boot when a sidewise force applied to the ski boot exceeds a predetermined value;*

*lower support means mounted on said base means;*

*pedal means for engaging a bottom surface of a sole portion of a ski boot in said toe piece, said pedal means being pivotally mounted for movement with said soleholder means in response to the movement of the ski boot retained in the toe piece; said pedal means being disposed over said lower support means and having first ramp means including a series of ramps joined by juncture means; said juncture means extending in directions generally parallel to said side portions and located for engagement by said lower support means when a downward force is exerted on said pedal means in the absence of sidewise forces, said first ramp means including ramps inclined from said juncture means towards opposite sides of said toe piece for engagement by said lower support means when said pedal means is subjected to downward and sidewise forces, the ramps configured for engagement by said lower support means for establishing forces offsetting the sidewise forces resulting from friction between said ramp means and said lower support means;*

*wherein said soleholder means and said pedal means are laterally movable as a unit with the movement of said ski boot prior to release ot said ski boot.*

*18. The invention according to claim 17 wherein said first ramp means includes a series of transverse ramps in the form of a W when viewed in the longitudinal direction, said juncture means comprising regions between the transverse ramps of said first ramp means.*

*19. The invention according to claim 17 wherein said lower support means comprise posts mounted in said base means.*

*20. The invention according to claim 19 wherein said posts include a pair of posts disposed symmetrically on opposite sides of the longitudinal axis of said toe piece.*

*21. The toe piece according to claim 17 and further comprising a pair of levers mounted on said base means for pivotal movement about vertical axes disposed on opposite sides of the longitudinal axis of the toe piece, said levers extending rearwardly and each carrying vertical soleholder axles disposed symmetrically about the longitudinal axis;*

*and wherein said soleholder means comprises a pair of soleholders pivotally mounted on said soleholder axles.*

*22. The invention according to claim 21 and further including a coupling member mounted on said soleholder axles and extending rearwardly, said pedal means forming part of said coupling member.*

*23. The invention according to claim 17 and further including:*

*upper support means fixedly mounted relative to said base means;*

*second ramp means movable in response to movement of said soleholder means, said second ramp means including transverse ramps meeting at a second juncture means, said second juncture means being engageable by said upper support means when said soleholder means is subjected to upward forces in the absence of sidewise forces, said transverse ramps of said second ramp means being inclined towards the opposite sides of said toe piece for engagement by said upper support means when said soleholder means is subjected to upward and sidewise forces, or to rotational loads, the ramps engaged by said upper support means being contoured to establish forces offsetting the forces resulting from friction between the latter ramps and said upper support means.*

*24. The invention according to claim 23 wherein said upper support means comprise roller means mounted for rotation about longitudinal axis.*

*25. The invention according to claim 23 and further comprising a pair of levers pivotally mounted on said base means for pivotal movement about vertical axes disposed on opposite sides of the longitudinal axis of the toe piece, said soleholder means including soleholders pivotally mounted on said respective levers, and said second ramp means comprising a pair of A-shaped portions on the respective levers engageable by said upper support means.*

* * * * *

UNITED STATES PATENT AND TRADEMARK OFFICE

CERTIFICATE OF CORRECTION

PATENT NO. : RE 33,388

DATED : October 16, 1990

INVENTOR(S) : Sedlmair et al.

It is certified that error appears in the above-identified patent and that said Letters Patent is hereby corrected as shown below:

Cover Sheet - Assignee should be corrected to read --Marker International Company Salt Lake City, Utah--.

Cover Sheet - Foreign Application Priority Data - the date of the German patent should be --February 1, 1984--

Signed and Sealed this

Thirteenth Day of October, 1992

*Attest:*

DOUGLAS B. COMER

*Attesting Officer*

*Acting Commissioner of Patents and Trademarks*

UNITED STATES PATENT AND TRADEMARK OFFICE

CERTIFICATE OF CORRECTION

PATENT NO. : RE 33,388

DATED : October 16, 1990

INVENTOR(S) : Sedlmair et al.

It is certified that error appears in the above-indentified patent and that said Letters Patent is hereby corrected as shown below:

The drawing sheet, consisting of Fig. 7, should be added as shown on the attached page.

Signed and Sealed this

Eighteenth Day of June, 1996

Bruce Lehman

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE 33,388

DATED : October 16, 1990

INVENTOR(S) : Sedlmair et al.

It is certified that error appears in the above-indentified patent and that said Letters Patent is hereby corrected as shown below:

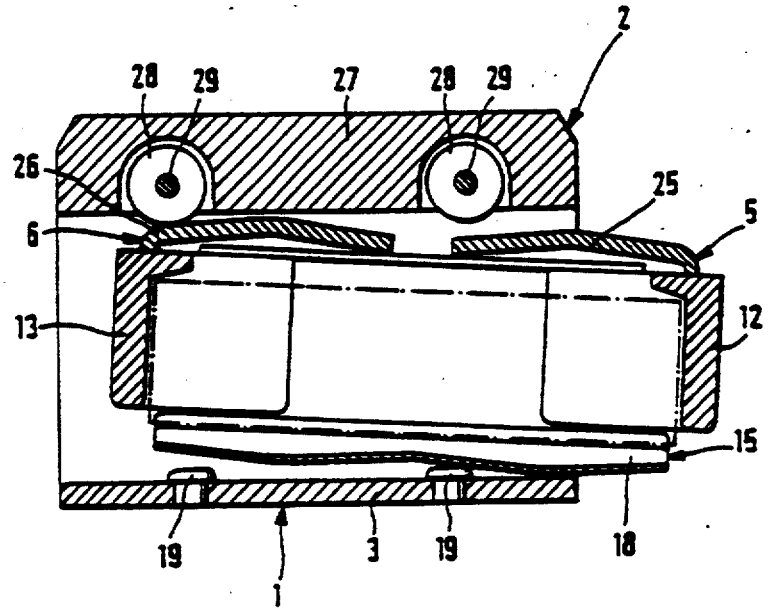

FIG.7